(12) United States Patent
Sang et al.

(10) Patent No.: US 8,290,061 B2
(45) Date of Patent: Oct. 16, 2012

(54) METHOD AND APPARATUS FOR ADAPTIVE FRAME AVERAGING

(75) Inventors: Maodong Sang, Shenzhen (CN); Yong Wang, Shenzhen (CN); Yu Zhang, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 961 days.

(21) Appl. No.: 12/346,331

(22) Filed: Dec. 30, 2008

(65) Prior Publication Data

US 2009/0225827 A1 Sep. 10, 2009

(30) Foreign Application Priority Data

Mar. 7, 2008 (CN) .......................... 2008 1 0065803

(51) Int. Cl.
*H04N 11/04* (2006.01)
(52) U.S. Cl. ......... 375/240.24; 375/240.12; 375/240.18; 375/240.21
(58) Field of Classification Search .................. None
See application file for complete search history.

(56) References Cited

U.S. PATENT DOCUMENTS

| 5,060,515 | A | | 10/1991 | Kanda et al. |
| 5,473,384 | A | * | 12/1995 | Jayant et al. ................. 348/470 |
| 6,122,314 | A | * | 9/2000 | Bruls et al. ............... 375/240.12 |
| 6,270,459 | B1 | | 8/2001 | Konofagou et al. |
| 8,026,894 | B2 | * | 9/2011 | Feng ............................. 345/102 |
| 2006/0173313 | A1 | | 8/2006 | Liu et al. |
| 2006/0239571 | A1 | | 10/2006 | Dong et al. |
| 2009/0180033 | A1 | * | 7/2009 | Chang .......................... 348/720 |

FOREIGN PATENT DOCUMENTS

| CN | 1387827 A | 1/2003 |
| CN | 101039627 A | 9/2007 |

* cited by examiner

*Primary Examiner* — Kaveh Abrishamkar
(74) *Attorney, Agent, or Firm* — Kory D. Christensen; Stoel Rives LLP (57) ABSTRACT

A method for adaptive frame averaging includes dividing a current frame image into a plurality of sub-blocks; obtaining a characteristic for each of the plurality of sub-blocks to obtain a characteristic image of the current frame image; determining a frame averaging coefficient for each of the plurality of sub-blocks based on the characteristic image of the current frame image and a characteristic image of a previous frame image; and frame-averaging a resultant frame-averaged image of the previous frame image and the current frame image by using the frame averaging coefficient of each of the plurality of sub-blocks to obtain a resultant frame-averaged image of the current frame image.

19 Claims, 6 Drawing Sheets

METHOD AND APPARATUS FOR ADAPTIVE FRAME AVERAGING

CROSS-REFERENCE TO RELATED APPLICATIONS

This application claims priority to Chinese Patent Application No. 200810065803.X, filed Mar. 7, 2008, for "METHOD AND APPARATUS FOR ADAPTIVE FRAME AVERAGING," which is incorporated herein by reference.

TECHNICAL FIELD

This disclosure relates to ultrasound imaging.

SUMMARY

A method and apparatus for adaptive frame averaging in an ultrasound imaging system is disclosed.

DETAILED DESCRIPTION

In a B-mode ultrasound imaging system, noise that affects the image quality (e.g., contrast resolution, signal to noise ratio) typically includes random noise and speckle noise. To improve image quality, compounding techniques are used in the ultrasound imaging system, including spatial compounding, frequency compounding and temporal compounding.

Temporal compounding, i.e., frame averaging, may reduce noise in a black and white ultrasound image, improve the contrast resolution and the signal to noise ratio of the image, thereby improving the sharpness and readability of the image. Furthermore, since it is relatively inexpensive to implement temporal compounding without significant loss of spatial resolution, temporal compounding is often used in ultrasound imaging. Since random noise in the images at different moments is uncorrelated, temporal compounding of the images at different moments may effectively suppress the noise and improve the signal to noise ratio of the image.

Although speckle noise produced by a stationary target is not random, the speckle noise is in fact changed by both the movement of tissues in a human body and the movement of an ultrasound probe. Therefore, the speckle noise in different frame images is typically less correlated with each other, so that temporal compounding may be used to reduce the effect of the speckle noise and improve the contrast resolution of the image.

However, imaging a vigorously moving target (e.g., a fast moving cardiac muscle and valve in the cardiac imaging) would possibly lead to reduction in temporal resolution and motion blurring of an image. Therefore, for organs that move to different degrees, the corresponding frame averaging degrees are discriminated. Even for two successive frames of images for the same organ, different frame averaging degrees are applied to different areas in the images in that the degrees of motion also differ in different areas. The frame averaging degree needs to vary in accordance with the content of an image, which is an "adaptive" frame averaging technique. Traditional frame averaging uses fixed coefficients, whereas adaptive frame averaging may automatically adjust frame averaging coefficients based on the content of an image, thereby reducing blurring of motion resulting from frame averaging while suppressing noise.

In order to save storage and processor resources, adaptive frame averaging may be implemented by a first-order recursive low-pass filter, which is shown by the following formula:

$$Y(K)=\alpha Y(K-1)+(1-\alpha)X(K), 0<\alpha<1,$$

where $X(K)$ represents the current frame image, $Y(K)$ represents the output frame-averaged value of the current frame image, $Y(K-1)$ represents the output frame-averaged value of the previous frame image, and $\alpha$ is an adjustable frame averaging coefficient.

At present, the basic concept underlying existing adaptive frame averaging techniques is that a frame averaging coefficient is determined on the basis of one of the resultant frame-averaged images, i.e., $Y(K-1)$ of the previous frame image and the current frame image $X(K)$ or the relationship therebetween. When $X(K)$ and $Y(K-1)$ are frame averaged, the coefficient calculation is often performed pixel point by pixel point, i.e., it is required to determine a frame averaging coefficient for each pixel point in the image prior to frame averaging.

This approach for determining a frame averaging coefficient pixel by pixel is greatly influenced by noise. For example, if a pixel does not move greatly in two successive frames, the gray values thereof should be rather close, but may actually be quite different owing to noise. In this case, a small frame averaging coefficient is obtained by the approach, and then a weak frame averaging is performed, thereby hardly achieving the purpose of suppressing noise. In contrast, for a vigorously moving pixel, if the difference between the gray values of two frames is made relatively small due to the influence caused by noise, then a large frame averaging coefficient is obtained by the approach, resulting in a strong frame averaging being performed causing motion blurring.

In order for determination of frame averaging coefficients to be less affected (or even not affected) by noise, and thus to suppress noise more effectively and reduce or even avoid motion blurring caused by frame averaging, the present disclosure provides a method and apparatus for adaptive frame averaging, in which the degree of frame averaging changes in accordance with the intensity of the change in the contents of two successive frame images. According to the present disclosure, the degree of frame averaging is inversely proportional to the motion intensity in the imaging area. That is, for a vigorously moving area, no frame averaging is substantially performed, while for a substantially stationary area, frame averaging is performed to the maximum extent.

The present disclosure provides a method for adaptive frame averaging including dividing a current frame image into a plurality of sub-blocks and obtaining a characteristic for each of the plurality of sub-blocks to obtain a characteristic image of the current frame image. The method may also include determining a frame averaging coefficient for each of the plurality of sub-blocks based on the characteristic image of the current frame image and a characteristic image of a previous frame image. In one embodiment, the method includes frame-averaging a resultant frame-averaged image of the previous frame image and the current frame image by using the frame-averaging coefficient of each of the plurality of sub-blocks to obtain a resultant frame-averaged image of the current frame image.

In one embodiment, the characteristic of each of the plurality of sub-blocks is represented by a mean value or a median value of all pixels of the corresponding sub-block. The current frame image and the previous frame image may be temporally successive or separate.

In one embodiment, the step of determining a frame-averaging coefficient includes calculating a motion variable for each of the plurality of sub-blocks and determining the frame averaging coefficient for each of the plurality of sub-blocks based on the motion variable of the corresponding sub-block.

In one embodiment, the frame averaging coefficient of each of the plurality of sub-blocks is a decreasing function of the motion variable of the corresponding sub-block.

In one embodiment, the motion variable of each of the plurality sub-blocks is represented by an absolute value of a difference between a characteristic of the corresponding sub-block in the characteristic image of the current frame image and that of the corresponding sub-block in the characteristic image of the previous frame image. The motion variable of each of the plurality of sub-blocks may also be selectively related to an intensity level of the corresponding sub-block.

In one embodiment, the intensity level of each of the plurality sub-blocks is represented by a mean value of a characteristic of the corresponding sub-block in the characteristic image of the current frame image and that of the corresponding sub-block in the characteristic image of the previous frame image. When an intensity level of a sub-block is larger than a threshold value, a motion variable of the sub-block may also be related to the intensity level of the sub-block; and when an intensity level of a sub-block is less than or equal to the threshold value, a motion variable of the sub-block may be unrelated to the intensity level of the sub-block.

In one embodiment, the frame averaging step is implemented by weighted averaging of the resultant frame-averaged image of the previous frame image and the current frame image. The weighted averaging may be performed on all pixels of each of the plurality of sub-blocks in the resultant frame-averaged image of the previous frame image and those of the corresponding sub-block in the current frame image by using the frame averaging coefficient of the corresponding sub-block.

In one embodiment, the frame averaging coefficient of each of a plurality of sub-blocks is linearly or nonlinearly interpolated to generate a frame averaging coefficient for each pixel in the corresponding sub-block, which is then used for weighted averaging of the corresponding pixel in the resultant frame-averaged image of the previous frame image and that in the current frame image.

In one embodiment, the method for adaptive frame averaging further comprises an image preprocessing step prior to the characteristic obtaining step, for noise reduction and/or enhancement processing of the current frame image so as to obtain an improved current frame image.

The present disclosure further provides an apparatus for adaptive frame averaging including a characteristic obtaining unit for dividing a current frame image into a plurality of sub-blocks and obtaining a characteristic for each of the plurality of sub-blocks to obtain a characteristic image of the current frame image. The apparatus may further include a coefficient determination unit for determining a frame averaging coefficient for each of the plurality of sub-blocks based on the characteristic image of the current frame image and a characteristic image of a previous frame image. In one embodiment, the apparatus includes a frame averaging unit for frame averaging a resultant frame-averaged image of the previous frame image and the current frame image by using the frame-averaging coefficient of each of the plurality of sub-blocks to obtain a resultant frame-averaged image of the current frame image.

In one embodiment, the apparatus for adaptive frame averaging also comprises a memory for storing the characteristic image of the previous frame image and the resultant frame-averaged image of the previous frame image. The apparatus for adaptive frame averaging may further comprise an image preprocessing unit for noise reduction and/or enhancement processing of the current frame image so as to obtain an improved current frame image, which is then input into the characteristic obtaining unit.

The coefficient determination unit may include a motion variable calculation unit for calculating a motion variable for each of the plurality of sub-blocks and a coefficient determination unit for determining the frame averaging coefficient for each of the plurality of sub-blocks based on the motion variable of the corresponding sub-block.

The embodiments of the disclosure will be best understood by reference to the drawings in which like numerals refer to like parts or steps throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail in order to avoid obscuring other aspects of the disclosure.

A skilled artisan will recognize that the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, propagation media or other types of media/machine-readable medium suitable for storing electronic instructions.

Certain aspects of the embodiments described herein may be implemented as software modules or components. As used herein, a software module or component may include any type of computer instruction or computer executable code located within a memory device and/or transmitted as electronic signals over a system bus or wired or wireless network.

A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Figure 1:
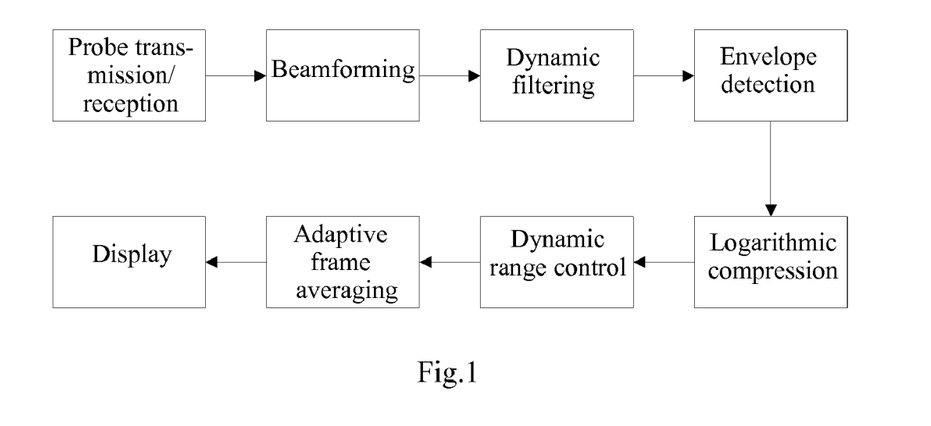
FIG. 1 is a functional schematic diagram of B-mode ultrasound imaging.

FIG. 1 is a functional schematic diagram of B-mode ultrasound imaging. A probe transmits a pulse signal into a human body and receives echo data after the pulse signal has been reflected by body tissues. Prior to be displayed, the received echo data may be subjected to the various processing, i.e., beamforming, dynamic filtering, envelope detection, logarithmic compression, dynamic range control, and adaptive frame averaging.

Figure 2:
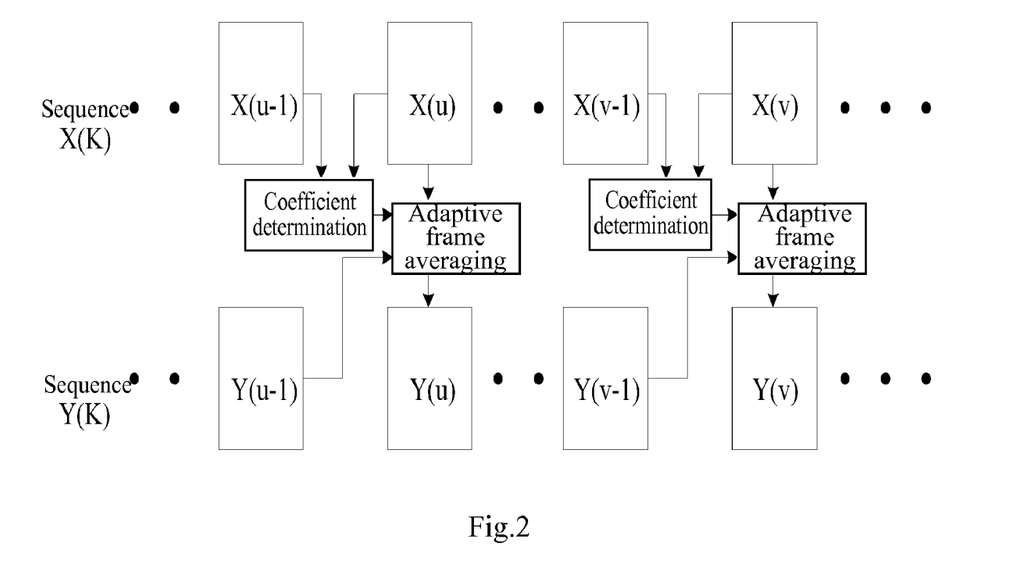
FIG. 2 is a data flow diagram of adaptively frame averaging image data.

FIG. 2 is a data flow diagram of adaptively frame averaging image data according to one embodiment. Sequence X(K) represents image data collected by the system, and Sequence Y(K) represents the adaptively frame-averaged image data, wherein K=0, . . . , u−1, u, . . . , v−1, v, . . . , and both u and v are natural numbers, while K is a non-negative integer.

Figure 3:
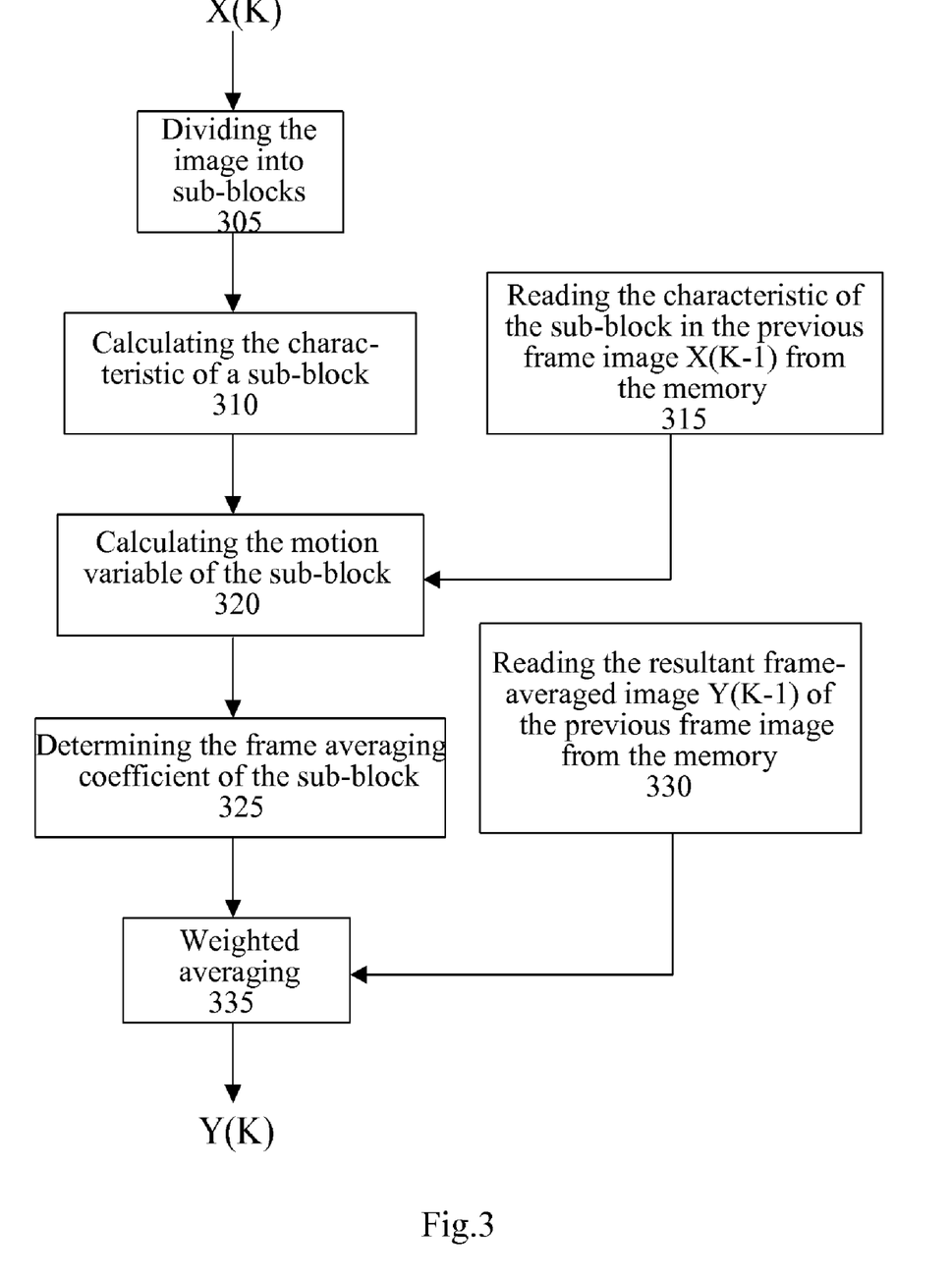
FIG. 3 is a flow chart of a method for adaptive frame averaging.

FIG. 3 is a flow chart of a method for adaptive frame averaging according to one embodiment. In Step 305, the current frame image X(K) is divided into sub-blocks. In one embodiment, the current frame image X(K) is divided into a plurality of equal-sized rectangular areas, i.e., sub-blocks. Assuming the size of the current frame image X(K) is W×H, and the size of a sub-block is M×N, then the number of sub-blocks is (W/M)×(H/N), wherein W represents the number of pixels in a row of the current frame image, H represents the number of pixels in a column of the current frame image, M represents the number of pixels in a row of a sub-block, and N represents the number of pixels in a column of a sub-block.

In one embodiment, W and H are selected to be divided exactly by M and N, respectively, and thus the position of each sub-block can be represented by (m, n), wherein $0 \leq m \leq W/M-1$, $0 \leq n \leq H/N-1$, and both m and n are non-negative integers. Since the size of the current frame image received from a buffer is not fixed but may change as the scan line density changes, the sizes of the divided rectangular areas or sub-blocks may change as the size of the entire current frame image changes.

In Step 310, a characteristic of each sub-block is obtained. In one embodiment, a mean-value characteristic of each sub-block is obtained. To be more specific, the values of all the pixels in a sub-block are added up and the resultant sum is divided by the number of the pixels in the sub-block, as shown in the following equation:

$$X_{zoom}(m, n) = \frac{\sum_{i=m \times M}^{(m+1) \times M - 1} \sum_{j=n \times N}^{(n+1) \times N - 1} X(i, j)}{M \times N}$$

where, $X_{zoom}(m, n)$ represents the mean brightness value of the sub-block at (m, n), X(i, j) represents the brightness value of the pixel at (i, j) of the current frame image, 023 $i \leq W-1$, $0 \leq j \leq H-1$, and both i and j are non-negative integers.

The mean value of the sub-block obtained thereby may be used as a yardstick for measuring the degree of motion of the sub-block. In one embodiment, the size of a sub-block may be set as a power of 2 so that the shift operation may replace the division operation in averaging, which may improve the execution speed of the algorithm.

Figure 4:
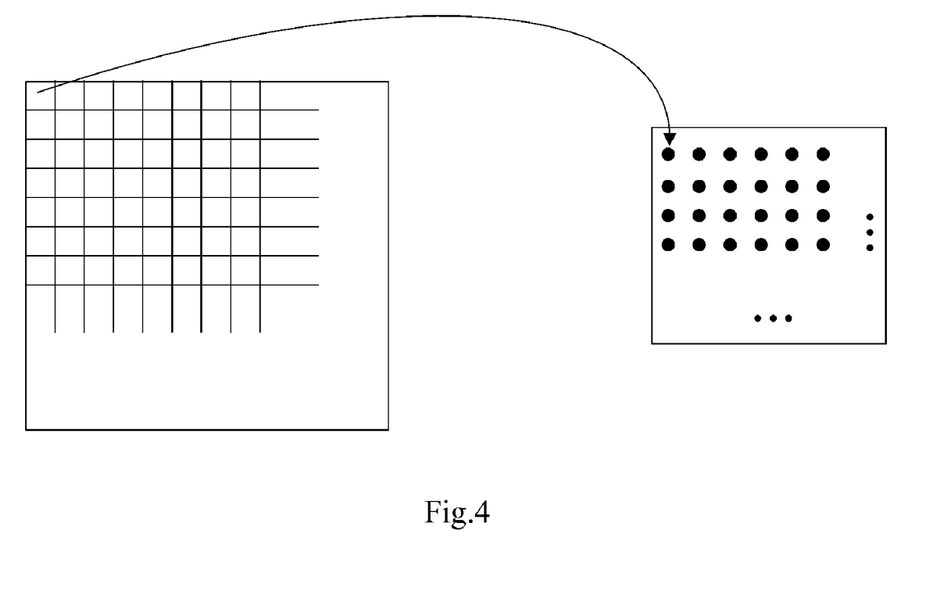
FIG. 4 is an illustration of dividing an image into sub-blocks and obtaining a mean value for each sub-block.

The characteristic image $X_{zoom}(K)$ of the current frame image is obtained by dividing the current frame image into sub-blocks and obtaining a mean value for each of the sub-blocks, and may be taken as an image that is M×N times as small as the current frame image. Each point in the characteristic image corresponds to a sub-block in the original current frame image, as shown in FIG. 4. The motion variable of each sub-block in the current frame image is calculated by using the characteristic image of the current frame image and the characteristic image of the previous frame image that is stored.

Continuing with reference to FIG. 3, in Step 315, the characteristic of each sub-block in the previous frame image X(K−1) is read from the memory.

In Step 320, the motion variable of each sub-block is calculated. To be specific, the degree of motion of each sub-block is described by the change in the mean value of the corresponding sub-block between two successive frames. In one embodiment, this change is represented by the absolute value of the difference between the mean value of the corresponding sub-block in one frame and that of the corresponding sub-block in the other frame, i.e., the degree of motion is represented by the absolute value of the difference between the mean value of the corresponding sub-block in one frame and that of the corresponding sub-block in the other frame in that the calculation of the difference between the mean values involves less complexity. The motion variable Motion(m, n) is obtained in accordance with the following equation:

$$Motion(m, n) = |X_{zoom}(m, n, K) - X_{zoom}(m, n, K-1)|$$

where, Motion(m, n) represents the motion variable of the sub-block at (m, n), $X_{zoom}(m, n, K)$ represents the brightness value at (m, n) in the characteristic image of the current frame image, and $X_{zoom}(m, n, K-1)$ represents the brightness value at (m, n) in the characteristic image of the previous frame image.

In Step 325, the frame averaging coefficient of each sub-block is determined. To be specific, the frame averaging coefficient of each sub-block is determined on the basis of the motion variable of the corresponding sub-block which is calculated in Step 320. A sub-block with a larger motion variable has a lower degree of frame averaging, while a sub-block with a smaller motion variable has a higher degree of frame averaging. That is, the frame averaging coefficient of a sub-block is a decreasing function of its motion variable. In one embodiment, the frame averaging coefficient α(m, n) of the sub-block at (m, n) can be calculated by using the natural exponential function:

$$\alpha(m,n) = \exp[-k \cdot Motion(m,n)], k > 0$$

where, k is an adjusting coefficient of the natural exponential function for adjusting the range of the exponential part in above equation so as to adjust the degree of frame averaging. It is to be noted that if k is excessively large, the frame averaging coefficients for most areas in the current frame image will be very small, even close to 0. Therefore, the range of k is defined as (0, 1]. In one embodiment, the range of the motion variable Motion (m, n) is [0, 255], which is multiplied by ⅛ to be narrowed, and then is multiplied by k.

In Step 330, the resultant frame-averaged image Y(K−1) of the previous frame image is read from the memory.

In Step 335, a weighted average of the resultant frame-averaged image of the previous frame image and the current frame image is obtained. To be specific, the weighted average is obtained by using the frame averaging coefficients of respective sub-blocks obtained in Step 325 in accordance with the frame averaging calculation formula as follows:

$$Y(K)=\alpha Y(K-1)+(1-\alpha)X(K), 0<\alpha<1,$$

where, X(K) represents the current frame image, Y(K) represents the frame-averaged result of the current frame image, Y(K−1) represents the frame-averaged result of the previous frame image, and α represents the frame averaging coefficient obtained in Step 325, each sub-block having a frame averaging coefficient α.

In one embodiment, the frame averaging coefficients in the sub-block-based adaptive frame averaging method may be determined in accordance with the following rules:
1. determine the frame averaging coefficients by using two successive frame images X(K) and X(K−1).
2. divide the frame image X(K) into a plurality of fixed-sized, i.e., M×N, rectangular areas ("sub-blocks"), and calculate a frame averaging coefficient for each sub-block, which will be used to calculate a weighted average for each of the pixels in the corresponding sub-block.
3. determine the frame averaging coefficient of each sub-block in the frame image X(K) by the degree of motion of the content of the corresponding sub-block between the two frame images, where the degree of motion is described by a motion variable, and the frame averaging coefficient is a function of the motion variable.

Figure 5:
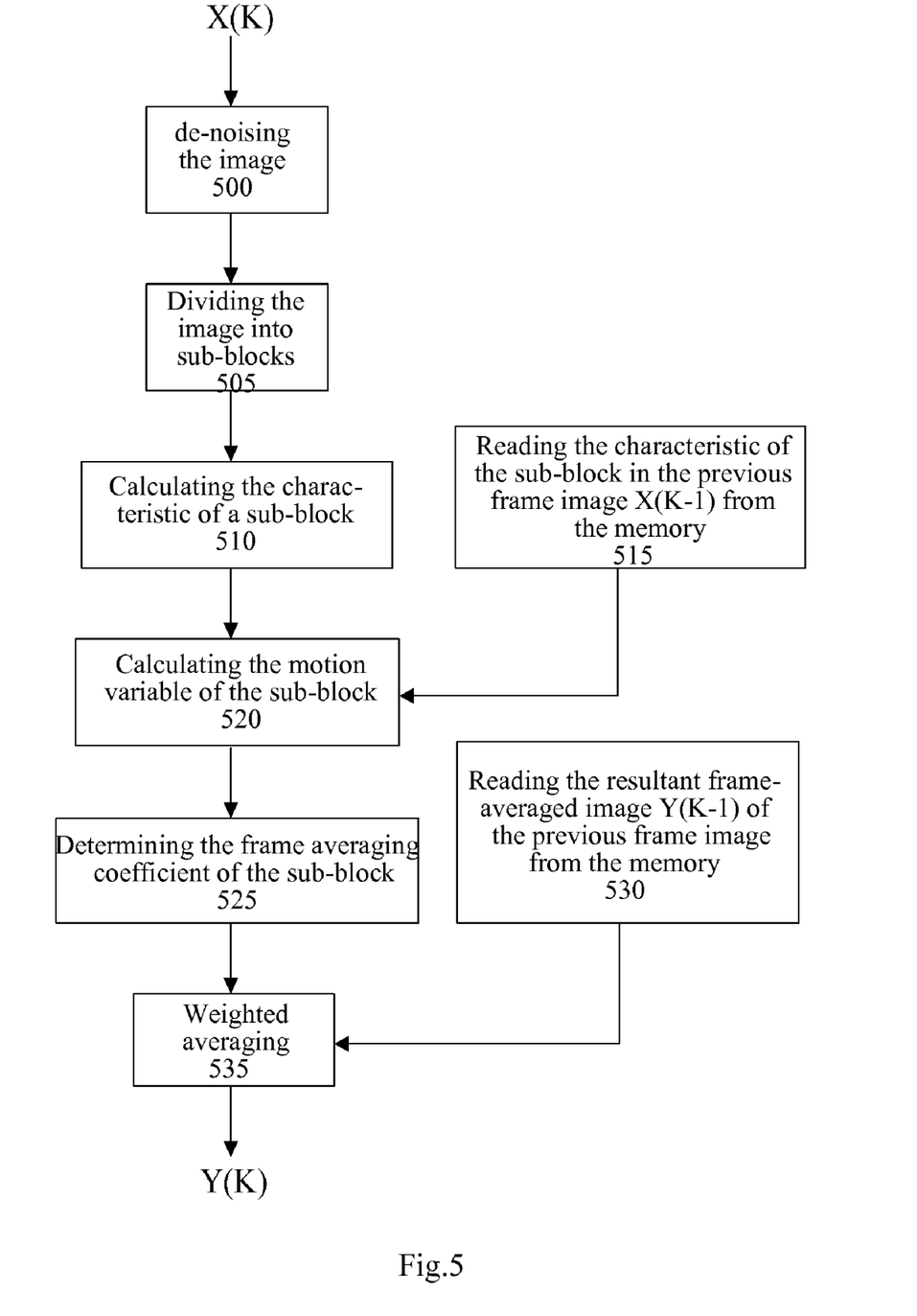
FIG. 5 is a flow chart of a method for adaptive frame averaging.

FIG. 5 is a schematic diagram of a method for adaptive frame averaging according to another embodiment. There are two differences between the method as shown in FIG. 5 and the method as shown in FIG. 3. One is the de-noise preprocessing of the current frame image prior to dividing it into sub-blocks, and the other is the introduction of an intensity level while calculating the motion variable of strong tissue echo content. The de-noise preprocessing is added to reduce and even avoid the noise interference in the motion of a sub-block, and the intensity level of a sub-block may be introduced for control of various application environments. Additionally, the method as shown in FIG. 5 also takes account of the effect of the strong echo tissue on frame averaging.

As shown in FIG. 5, in Step 500, the de-noise preprocessing may be performed on the current frame image. To be specific, random noise and speckle noise in a sub-block of an image may affect the mean value of the sub-block, thereby affecting the accuracy of the determination of the degree of motion of the sub-block. In the dim areas of an image, the side effect of noise is especially clear, which causes the frame averaging coefficients to be smaller, and thus weakens the de-noise effect of frame averaging. Therefore, by preprocessing the collected image prior to divide it into sub-blocks and obtaining a mean value for each of the sub-blocks, it is possible to weaken and even eliminate the effect of noise so as to improve the accuracy of the calculation of the degree of motion. The specific de-noise methods may be implemented in a mode selected depending on actual circumstances from low pass filtering like IIR (Infinite Impulse Response) or FIR (Finite Impulse Response) or median filtering. In one embodiment, the de-noise mode of mean-value filtering or Wiener filtering may be used. In another embodiment, high-frequency coefficients are dropped after orthogonal transformation, e.g., DCT (Discrete Cosine Transformation), DWT (Discrete Wavelet Transformation), or DFT (Discrete Fourier Transformation), etc.) prior to inverse transformation. Taking the de-noise mode of IIR low-pass filtering as an example, each row and each column of each image will be sequentially processed as follows:

$$X'(i,j)=\beta X'(i-1,j)+(1-\beta)X(i,j), X''(i,j)=\beta X''(i,j-1)+(1-\beta)X'(i,j),$$

where, X'(i, j) represents the image with the row processed, X''(i, j) represents the de-noised image with both the row and the column processed, and β represents the coefficient of the de-noise preprocessing.

The de-noise mode of mean-value filtering may also be used. To improve efficiency, the size of window may be set three times of the size of sub-block, which combines the step of smoothing processing and the step of obtaining the mean value of a sub-block into one step, thereby improving the execution speed.

Steps 505, 510 and 515 in FIG. 5 are identical to Steps 305, 310 and 315 in FIG. 3, and therefore are not elaborated again. In Step 520, the motion variable of a sub-block is calculated. In one embodiment, the motion variable of a sub-block is not only related to the degree of motion of the sub-block, but also to the intensity level of the sub-block. For an ultrasound image, different brightness areas have different requirements for frame averaging. It is easier to cause motion blurring in a brighter area. In contrast, it is relatively harder to cause visual blurring in a dimmer area. Therefore, it is desired to reduce frame averaging of the brighter area in the image, so as to weaken the motion blurring of the brighter area. Therefore, the motion variable may be associated with the image content in the calculation of the motion variable. The intensity level of a sub-block may be obtained by averaging the mean values of the sub-block in two successive frames. The difference of the mean values simply reflects the adaptability of the method for adaptive frame averaging to the degree of motion, while the addition of the intensity level reflects the adaptability of the method for adaptive frame averaging to the image content. In this case, the formula for calculating the motion variable Motion(m, n) in Step 520 becomes:

$$Motion(m,n) = S \cdot \left( \frac{X_{zoom}(m,n,K) + X_{zoom}(m,n,K-1)}{2} - T \right) + |X_{zoom}(m,n,K) - X_{zoom}(m,n,K-1)|$$

where, S represents an intensity control factor, and T represents an intensity threshold value.

In one embodiment, only the intensity level that is larger than the intensity threshold value is taken in the calculation of the motion variable. The frame averaging coefficients for areas of different gray scales may be adjusted by adjusting the intensity threshold value, where the frame averaging coefficients of the areas with the intensity level larger than the intensity threshold value are made smaller such that the motion can be tracked better in these areas, so as to further suppress motion blurring caused by frame averaging.

Steps 525, 530 and 535 in FIG. 5 are identical to Steps 325, 330 and 335 in FIG. 3 and therefore are not elaborated again.

In one embodiment, a method for adaptive frame averaging is performed as follows.

(1) In the initialization phase for starting adaptive frame averaging, the parameters required for adaptive frame averaging are set and stored in a memory, such as the coefficient β used for de-noise preprocessing, the image width W and height H, M and N jointly representing the sub-block size, the adjusting coefficient k of the natural exponential function, the intensity threshold value T, and the intensity control factor S; and a memory is initialized for storing all of the intermediate values and the resultant frame-averaged images, i.e., the image values are assigned zero.

(2) Spatial de-noise preprocessing is performed on the newly collected image, i.e., the current frame image; the de-noised image is divided into sub-blocks and a mean value is obtained for each of the sub-blocks to obtain the characteristic image of the current frame image. A subtraction operation is performed between the characteristic image of the current frame image and the characteristic image of the previous frame image in the memory and the absolute value of the resultant difference is obtained while the mean brightness value of the two frames of characteristic images is calculated as the intensity level. The characteristic image of the current frame image is substituted for the characteristic image of the previous frame image in the memory.

(3) The intensity threshold value is subtracted from the intensity level; the resultant difference larger than zero is multiplied by the intensity control factor; and the multiplication result is added to the absolute value of the difference between the mean values obtained in the previous step, thereby obtaining a sum to be used as the motion variable of the sub-block. The newest mean-value characteristic is substituted for the original mean-value characteristic in the memory.

(4) The motion variable is multiplied by the adjusting coefficient of the natural exponential function, and the frame averaging coefficient is calculated with the natural exponential function.

(5) The resultant frame-averaged image of the previous frame image is read from the memory and the calculated frame averaging coefficient is used to obtain a weighted sum of each sub-block in this image and the newly collected image in accordance with the frame averaging formula, so as to obtain the resultant frame-averaged image of the current frame image. The resultant frame-averaged image of the current frame image is substituted for the resultant frame-averaged image of the previous frame image in the memory.

Figure 6:
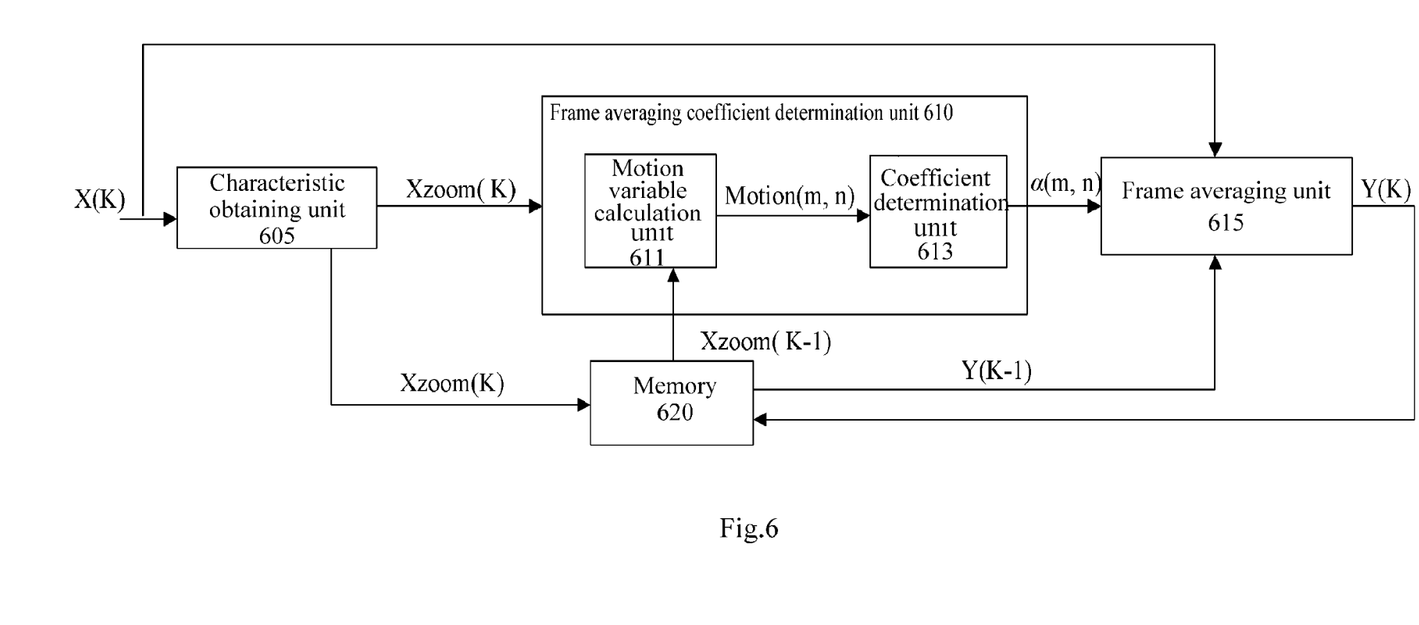
FIG. 6 is a block diagram of an apparatus for adaptive frame averaging.

In a B-mode ultrasound imaging system, an ultrasound echo signal is processed into a video image, which is then input into an apparatus for adaptive frame averaging. The apparatus for adaptive frame averaging determines frame averaging coefficients based on the image content, and performs frame averaging. FIG. 6 is a block diagram of an apparatus for adaptive frame averaging according to one embodiment.

As shown in FIG. 6, the apparatus for adaptive frame averaging may include a characteristic obtaining unit 605 for dividing the current frame image X(K) into a plurality of sub-blocks and obtaining a characteristic for each of the plurality of sub-blocks, so as to obtain the characteristic image $X_{zoom}(K)$ of the current frame image. The apparatus may further include a frame averaging coefficient determination unit 610 for determining a frame averaging coefficient α(m, n) for each of the plurality of sub-blocks based on the characteristic image $X_{zoom}(K)$ of the current frame image and the characteristic image $X_{zoom}(K-1)$ of the previous frame image.

In one embodiment, the apparatus includes a frame averaging unit 615 for frame averaging the frame-averaged image Y(K−1) of the previous frame image and the current frame image X(K) with the frame averaging coefficient a(m, n) of each of the plurality of sub-blocks, so as to obtain the resultant frame-averaged image Y(K) of the current frame image. The frame averaging coefficient determination unit 610 may include a motion variable calculation unit 611 for calculating a motion variable Motion(m, n) for each of the plurality of sub-blocks; and a coefficient determination unit 613 for determining a frame averaging coefficient α(m, n) for each of the plurality of sub-blocks based on the motion variable Motion (m, n) of the corresponding sub-block. In one embodiment, the apparatus for adaptive frame averaging also comprises a memory 620 for storing the resultant frame-averaged image Y(K−1) of the previous frame image and the characteristic image $X_{zoom}(K-1)$ of the previous frame image.

In one embodiment, the characteristic obtaining unit 605 divides the obtained current frame image X(K) into a plurality of sub-blocks, and obtains a mean-value characteristic for each of the plurality of sub-blocks, thereby obtaining the characteristic image $X_{zoom}(K)$ of the current frame image which is then input into the motion variable calculation unit 611 in the frame averaging coefficient determination unit 610. The motion variable calculation unit 611 takes the characteristic image $X_{zoom}(K-1)$ of the previous frame image from the memory 620, and uses the characteristic image $X_{zoom}(K)$ of the current frame image and the characteristic image $X_{zoom}(K-1)$ of the previous frame image to calculate a motion variable Motion(m, n) for each sub-block in the current frame image.

The motion variable Motion(m, n) of each sub-block may be input into the coefficient determination unit 613 and the natural exponential function is used to determine a frame averaging coefficient α(m, n) for each sub-block, such that each sub-block has a respective frame averaging coefficient. The coefficient determination unit 613 may then output the determined frame averaging coefficient α(m, n) to the frame averaging unit 615.

In one embodiment, the frame averaging unit 615 takes the resultant frame-averaged image Y(K−1) of the previous frame image from the memory 20and performs frame averaging point by point on the resultant frame-averaged image Y(K−1) of the previous frame image and the current frame image X(K) based on the frame averaging coefficients to obtain the resultant frame-averaged image Y(K) of the current frame image. Finally, the characteristic image $X_{zoom}(K-1)$ of the precious frame image in the memory is replaced with the characteristic image $X_{zoom}(K)$ of the current frame image, and the resultant frame-averaged image Y(K) of the current frame image is stored at the position of Y(K−1) in the memory for use in the next frame averaging.

In another embodiment, the apparatus for adaptive frame averaging further comprises an image preprocessing unit for noise reduction and/or enhancement processing of the current frame image so as to obtain an improved current frame image which is then input into the characteristic obtaining unit. Thereafter, the characteristic obtaining unit divides the improved current frame image into a plurality of sub-blocks, and calculates a mean-value characteristic for each of the plurality of sub-blocks, which is then sent to the motion variable calculation unit.

In one embodiment, the motion variable calculation unit calculates the motion variable of a sub-block not only based on the degree of motion of the sub-block, but also based on the intensity level of the sub-block. The motion variable calculation unit takes the mean-value characteristic of the previous frame image X(K−1) from the memory, calculates the absolute value of the difference between the mean-value characteristic of the current frame image and that of the previous frame image, obtains the intensity level of a sub-block by averaging the mean-value characteristics of the sub-block in the current frame image and the previous frame image, subtracts the intensity threshold value from the intensity level of the sub-block, takes the resultant difference larger than zero to be multiplied by the intensity control factor, adds the multiplication result to the just-obtained absolute value of the difference between the mean-value characteristics to obtain a sum as the motion variable of the sub-block, and substitutes the mean-value characteristic of the current frame image for the original mean-value characteristic in the memory.

The motion variable of each sub-block is input into the coefficient determination unit, and the natural exponential function is used to determine a frame averaging coefficient for each sub-block, such that each sub-block has a respective frame averaging coefficient. The coefficient determination unit outputs the determined frame averaging coefficients to the frame averaging unit. The frame averaging unit takes the previous frame-averaged result Y(K−1) from the memory and performs frame averaging point by point on the previous frame-averaged result Y(K−1) and the current frame image X(K) based on the frame averaging coefficients to obtain the resultant frame-averaged image Y(K) of the current frame image. Finally, the mean-value characteristic of X(K−1) in the memory is replaced with the mean-value characteristic of the current frame image X(K), and the resultant frame-averaged image Y(K) of the current frame image is stored at the position of Y(K−1) in the memory for use in the next frame averaging. The image which has been processed by the apparatus for adaptive frame averaging can then be input into a display device for real-time display.

Figure 7:
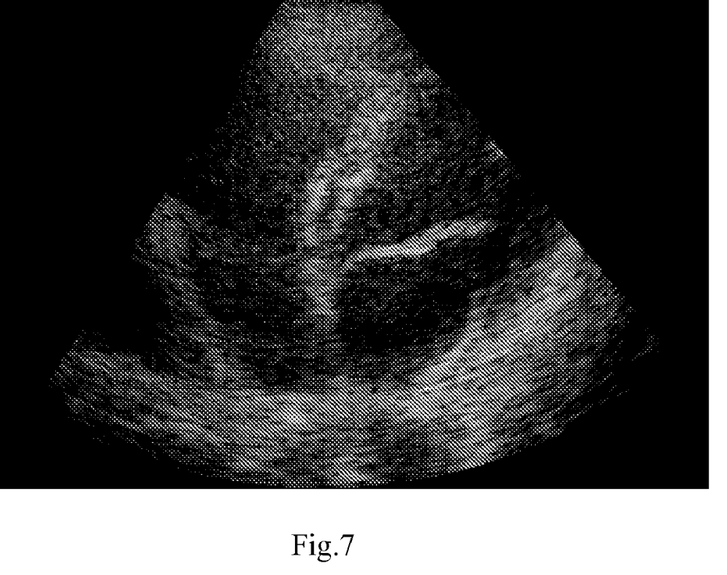
FIG. 7 shows an image that is not frame-averaged.
Figure 8:
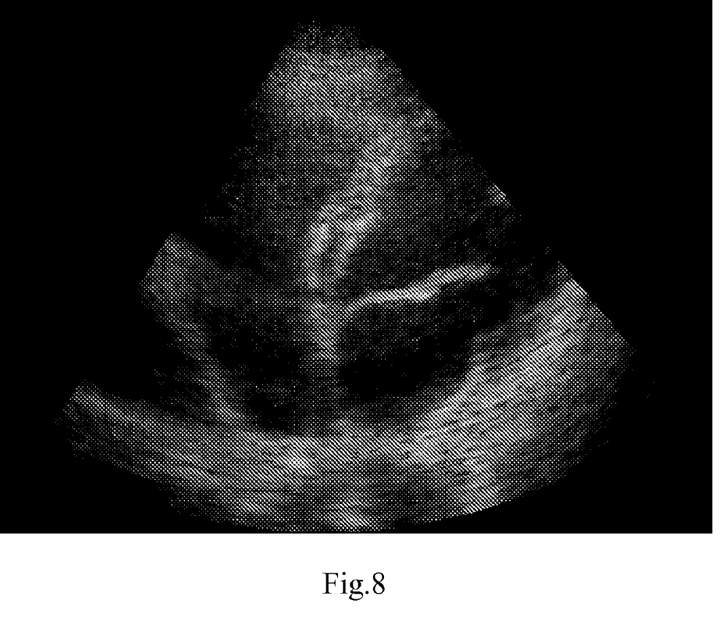
FIG. 8 shows an image that is adaptively frame-averaged.

FIG. 7 shows the ultrasound image of a cardiac organ prior to adaptive frame averaging, while FIG. 8 shows the ultrasound image of the cardiac organ after adaptive frame averaging as shown in FIG. 5. It can be seen that the quality of the ultrasound image of the cardiac organ is improved after adaptive frame averaging, and motion blurring is weakened, thus benefiting clinical diagnosis.

It is to be noted that images used for calculating the motion variable of a sub-block are not limited to two successive frames of images. In fact, two non-successive frames of data, multiple successive or non-successive frames of data may also be used for calculation.

The degree of motion of a sub-block is not limited to being represented by the absolute value of the difference between mean values, but may also be represented by other values, such as the difference between median images, the Euclidean distance between sub-block images, or the like.

Furthermore, with regard to frame averaging coefficients used for frame-averaging image frames in accordance with the frame averaging formula, the pixels in the same sub-block are not limited to using the same frame averaging coefficient. Alternatively, in a sub-block, the pixels in the same row may use the same frame averaging coefficient, or the pixels in the same column may use the same frame averaging coefficient, or each pixel may use a different frame averaging coefficient. The different frame averaging coefficients may be obtained by calculating a frame averaging coefficient for each sub-block, and then performing a linear or nonlinear interpolation operation to obtain a frame averaging coefficient for each row, each column or each pixel.

Although the invention has been described above with reference to specific embodiments, it is not intended to be so limited. Various modifications and alternations may be made within the scope of the invention, which is only limited by appended claims.

What is claimed is:

1. A method for adaptive frame averaging within an ultrasound imaging system, comprising:
   storing in a memory a current frame image representing echo signals obtained from an ultrasound probe;
   using a characteristic obtaining unit to:
      divide the current frame image into a plurality of sub-blocks; and
      obtain a characteristic for each of the plurality of sub-blocks to obtain a characteristic image of the current frame image;
   determining a frame averaging coefficient for each of the plurality of sub-blocks using a coefficient determination unit based on the characteristic image of the current frame image and a characteristic image of a previous frame image; and
   frame-averaging a resultant frame-averaged image of the previous frame image and the current frame image using a frame averaging coefficient determination unit by using the frame averaging coefficient of each of the plurality of sub-blocks to obtain a resultant frame-averaged image of the current frame image.

2. The method according to claim 1, wherein the characteristic of each of the plurality of sub-blocks is represented by a mean value or a median value of all pixels of the corresponding sub-block.

3. The method according to claim 1, wherein the current frame image and the previous frame image are temporally successive.

4. The method according to claim 1, wherein the current frame image and the previous frame image are temporally non-successive.

5. The method according to claim 1, wherein determining a frame averaging coefficient comprises:
   calculating a motion variable for each of the plurality of sub-blocks; and
   determining the frame averaging coefficient for each of the plurality of sub-blocks based on the motion variable of the corresponding sub-block.

6. The method according to claim 5, wherein the frame averaging coefficient of each of the plurality of sub-blocks is a decreasing function of the motion variable of the corresponding sub-block.

7. The method according to claim 6, wherein the motion variable of each of the plurality sub-blocks is represented by an absolute value of a difference between a characteristic of the corresponding sub-block in the characteristic image of the current frame image and that of the corresponding sub-block in the characteristic image of the previous frame image.

8. The method according to claim 7, wherein the motion variable of each of the plurality of sub-blocks is selectively related to an intensity level of the corresponding sub-block.

9. The method according to claim 8, wherein the intensity level of each of the plurality sub-blocks is represented by a mean value of a characteristic of the corresponding sub-block in the characteristic image of the current frame image and that of the corresponding sub-block in the characteristic image of the previous frame image.

10. The method according to claim 9, wherein, when an intensity level of a sub-block is larger than a threshold value, a motion variable of the sub-block is also related to the intensity level of the sub-block; and, when an intensity level of a sub-block is less than or equal to the threshold value, a motion variable of the sub-block is unrelated to the intensity level of the sub-block.

11. The method according to claim 1, wherein frame-averaging comprises using a weighted averaging of the resultant frame-averaged image of the previous frame image and the current frame image.

12. The method according to claim 11, wherein the weighted averaging is performed on all pixels of each of the plurality of sub-blocks in the resultant frame-averaged image of the previous frame image and those of the corresponding sub-block in the current frame image by using the frame averaging coefficient of the corresponding sub-block.

13. The method according to claim 11, wherein the frame averaging coefficient of each of a plurality of sub-blocks is linearly or nonlinearly interpolated to generate a frame averaging coefficient for each pixel in the corresponding sub-block, which is then used for weighted averaging of the corresponding pixel in the resultant frame-averaged image of the previous frame image and that in the current frame image.

14. The method according to claim 1, further comprising, prior to obtaining a characteristic, performing noise reduction and/or enhancement processing of the current frame image so as to obtain an improved current frame image.

15. An apparatus for adaptive frame averaging, comprising:
   a characteristic obtaining unit for dividing a current frame image into a plurality of sub-blocks, and obtaining a characteristic for each of the plurality of sub-blocks to obtain a characteristic image of the current frame image;
   a frame averaging coefficient determination unit for determining a frame averaging coefficient for each of the plurality of sub-blocks based on the characteristic image of the current frame image and a characteristic image of a previous frame image; and
   a frame averaging unit for frame-averaging a resultant frame-averaged image of the previous frame image and the current frame image by using the frame averaging coefficient of each of the plurality of sub-blocks to obtain a resultant frame-averaged image of the current frame image.

16. The apparatus according to claim 15, further comprising a memory for storing the characteristic image of the previous frame image and the resultant frame-averaged image of the previous frame image.

17. The apparatus according to claim 15, further comprising an image preprocessing unit for noise reduction and/or enhancement processing of the current frame image so as to obtain an improved current frame image which is then input into the characteristic obtaining unit.

18. The apparatus according to claim 15, wherein the coefficient determination unit comprises:
   a motion variable calculation unit for calculating a motion variable for each of the plurality of sub-blocks; and
   a coefficient determination unit for determining the frame averaging coefficient for each of the plurality of sub-blocks based on the motion variable of the corresponding sub-block.

19. An apparatus for adaptive frame averaging, comprising:
   means for dividing a current frame image into a plurality of sub-blocks;
   means for obtaining a characteristic for each of the plurality of sub-blocks to obtain a characteristic image of the current frame image;
   means for determining a frame averaging coefficient for each of the plurality of sub-blocks based on the characteristic image of the current frame image and a characteristic image of a previous frame image; and
   means for frame-averaging a resultant frame-averaged image of the previous frame image and the current frame image by using the frame averaging coefficient of each of the plurality of sub-blocks to obtain a resultant frame-averaged image of the current frame image.

\* \* \* \* \*